United States Patent Office 3,784,566
Patented Jan. 8, 1974

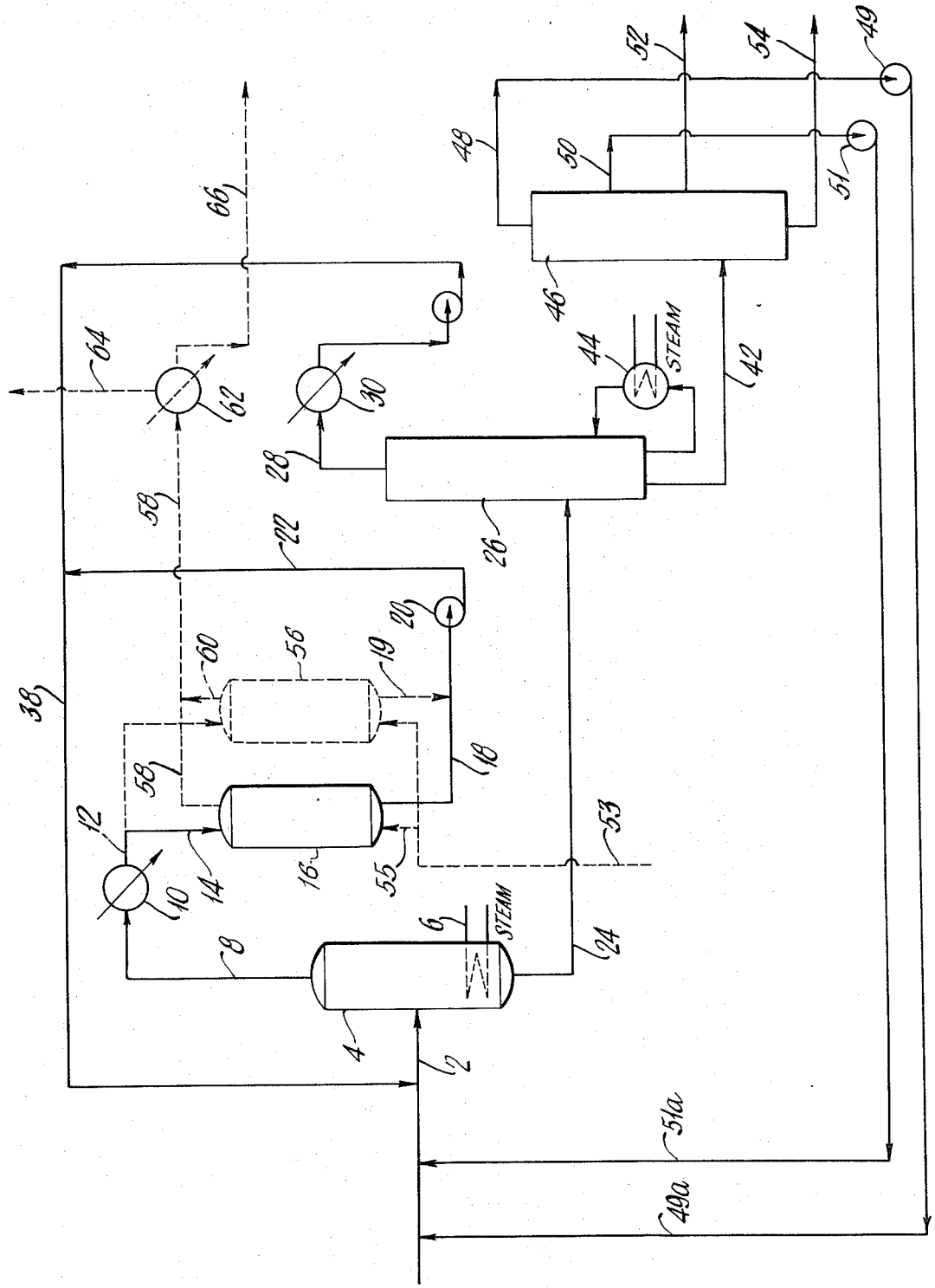

3,784,566
PROCESS FOR PREPARING DIALKYLAMINO-
ETHYL METHACRYLATE
John A. Patterson, Fishkill, N.Y., assignor to
Texaco Inc., New York, N.Y.
Filed Dec. 21, 1970, Ser. No. 99,794
Int. Cl. C07c 69/54
U.S. Cl. 260—486 R        17 Claims

ABSTRACT OF THE DISCLOSURE

Methyl methacrylate is reacted under refluxing conditions with a dialkylaminoethanol in the presence of a catalyst, such as sodium methoxide, and in the presence of an entrainer which, for example, is benzene. The methanol-benzene azeotrope, which is taken off overhead from the reaction zone, is condensed and the resulting liquid composition is passed through a molecular sieve bed for removal of the methanol. The benzene effluent free of methanol, withdrawn from the sieve bed is recycled to the reactor. A product stream removed from the reactor containing the dialkylaminoethyl methacrylate product together with unreacted dialkylaminoethanol, methyl methacrylate, catalyst and inhibitor is sent to a distillation area such as a distillation tower, or series thereof, for recovery of the product and the unreacted starting materials, i.e., the dialkylaminoethanol and the methyl methacrylate, which are recycled to the reaction zone.

FIELD OF THE INVENTION

This invention relates to a process for the transesterification of methyl methacrylate with a dialkylaminoethylethanol. More particularly, this invention relates to a transesterification process in which a dialkylaminoethanol is reacted with methyl methacrylate in the presence of an esterification catalyst and an entrainer or azeotrope forming agent such as benzene. The resulting azeotrope is removed overhead from the reaction zone and, after condensation, is passed through a molecular sieve bed for the removal of methanol, following which the azeotrope forming agent is returned to the reactor. The product and unreacted starting materials are recovered from the reaction mixture in a distillation zone and the unreacted starting materials recycled to the reaction zone.

DESCRIPTION OF THE PRIOR ART

A variety of processes are set forth in the literature for the preparation of dimethylaminoethyl methacrylate. For example, in U.S. Pat. 2,138,763 dimethylaminoethyl methacrylate is prepared by transesterifying methyl methacrylate with dimethylaminoethanol in the presence of benzene containing a small amount of p-phenylenediamine (an inhibitor) and in the presence of sodium methoxide under refluxing conditions and finally recovering from the reaction mixture by distillation the desired dimethylaminoethyl methacrylate in high yield. One disadvantage of this process is that prior to the present invention no satisfactory process existed which provided a method of decomposing the methanol-benzene azeotrope so that the benzene entrainer could be returned to the reaction zone.

It has also been suggested that the same methacrylic esters be prepared by direct esterification of methacrylic acid with the respective alcohols; however, this has not been successful apparently because of the interference of the acid catalyst usually employed with the amine. It has been found that when such an esterification reaction is attempted in the presence of benzene using enough sulfuric acid, for example, to serve as a catalyst and as a neutralizing agent for the amine group of the dimethylaminoethanol, little esterification occurs after refluxing for as long as 10 hours. In such a reaction the formation of a methanol-solvent azeotrope is avoided since the direct esterification reaction does not yield the alcohol.

It is therefore an object of the present invention to provide a process which is economic and which can be employed for preparing the dialkylaminoethyl methacrylates in high yield.

Another object of this invention is to provide a process for the preparation of dialkylaminoethyl methacrylates in which an entrainer is utilized to permit the removal of methanol formed during the reaction from the reaction zone as an azeotropic mixture and thus allowing the reaction to proceed substantially to completion.

Another object of this invention is to provide a process for the preparation of dialkylaminoethyl methacrylates in which the methanol contained in the methanol-solvent azeotrope is separated by passage through a molecular sieve bed.

Another object of this invention is to provide a process which can be operated in a continuous manner to give high yields of dialkylaminoethyl methacrylates.

SUMMARY OF THE INVENTION

In the process of this invention methyl methacrylate of the formula:

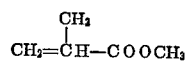

is reacted with an aminoalcohol of the formula:

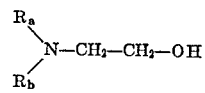

wherein $R_a$ and $R_b$ are independently selected alkyl radicals of from 1 to about 5 carbon atoms, in the presence of an esterification catalyst and in the presence of a material, such as benzene, which serves as an entrainer.

Overhead from the reaction zone there is withdrawn an azeotropic mixture which, after condensation, is passed through a molecular sieve bed for separation of the methanol which is recycled to the reaction zone. A product stream is also withdrawn from the reaction zone which contains the desired ester, unreacted aminoalcohol, unreacted methyl methacrylate, entrainer and catalyst. The said product stream is passed through a distillation train whereby the product is recovered in high yield and the unreacted feed materials are separated and returned to the reaction zone.

DETAILED DESCRIPTION OF THE INVENTION

Aminoalcohols suitable as reactants in the transesterification process of this invention include those of the formula:

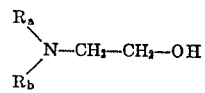

(I)

wherein $R_a$ and $R_b$ are independently selected alkyl groups of from 1 to 5 inclusive carbon atoms as exemplified by methyl, ethyl, propyl, butyl, pentyl and isomers thereof. Examples of such aminoalcohols include dimethylaminoethanol, methylethylaminoethanol, diethylaminoethanol, methyl-n-propylaminoethanol, methyl-isobutylaminoethanol, ethyl-isopropylaminoethanol, n-propyl-n-butylaminoethanol, ethyl-n-pentylaminoethanol, etc. Mixtures of the described aminoalcohols can be utilized, if desired. The above-mentioned aminoalcohols can be prepared by reacting ethylene oxide with the corresponding dialkylamine.

Advantageously, the reaction of this invention is conducted in the presence of an inhibitor added to prevent polymerization of the methyl methacrylate. Suitable inhibitors include hydroquinone, p-phenylenediamine, pyrogallol, tannic acid, sulfur, selenium, cuprous chloride, benzidine, p-methoxyphenol, etc. Generally, the methyl methacrylate charged to the reaction zone will contain from about 1 to about 10 weight percent of the inhibitor.

In conducting the transesterification reaction of this invention an excess of methyl methacrylate is employed in order to improve the yield. Generally, the mole ratio of the methyl methacrylate to the aminoalcohol is from about 1.01:1 to about 7:1 and, preferably, from about 1.1:1 to about 2:1.

A wide variety of esterification catalysts can be employed in the process of this invention. Useful catalysts include the alkali metal alkoxides, such as sodium methoxide, potassium methoxide, sodium ethoxide, lithium ethoxide, potassium propoxide, etc.; alkali metal aminoalkoxides, such as sodium dimethylaminoethoxide, etc. and alkali metal hydroxides, such as sodium hydroxide, potassium hydroxide, lithium hydroxide, etc.

Usually from about 0.02 to about 0.1 mole of the catalyst per mole of methyl methacrylate and, preferably, from about 0.04 to about 0.07 mole of the catalyst per mole of methacrylate is charged to the reaction zone. Azeotrope formers suitable for use in the process of this invention include, for example, benzene, toluene, cyclohexane and isohexane. All of these compounds form an azeotropic mixture with methanol. Benzene is particularly useful as an azeotrope former because of the relatively low boiling point of the benzene-methanol azeotrope and because of the high concentration of methanol in the azeotrope. Also, the methanol can be completely separated from the benzene-methanol azeotrope utilizing molecular sieve beds.

In separating the methanol from the methanol-containing azeotrope a molecular sieve of suitable size is employed. Preferably, with the benzene-methanol azeotrope, a 4A molecular sieve is utilized through a 3A sieve is suitable for use in this separation step. In actual practice, a pair of molecular sieve beds are used so that the methanol-containing azeotrope is being passed through one of the beds in the line while the other is being regenerated. The liquid hourly space velocity of the azeotrope per volume of the molecular sieve (i.e., LHSV) is about 1 to about 10. It is found that the effluent leaving the sieve bed is substantially free of methanol and that the benzene stream is suitable for recycling to the reaction zone.

In regenerating the molecular sieve materials occluded methanol is removed by blowing the sieve with an inert gas, such as nitrogen, flue gas, carbon dioxide, etc., at temperatures ranging from about 250° to about 550° C. and, preferably, at about 300° to about 425° C. Finally, the regeneration process is completed by passing air through the sieve in order to oxidize any traces of organic material remaining therein. It is found that when the sieves are regenerated in this manner they function at least as good as in their original state.

The refluxing temperature maintained in the reactor will depend on the particular entrainer being employed to form the azeotropic mixture. Operations may be conducted at atmospheric, sub-atmospheric or superatmospheric pressure as may be desired. Likewise, the transesterification process of this invention can be carried out in a continuous manner or as a batch operation.

The present invention can be more readily understood by referring to the accompanying flow diagram in which for purposes of illustration a preferred embodiment of the invention is set forth. A feed stream containing methyl methacrylate, dimethylaminoethanol, p-methoxyphenol (an inhibitor for methyl methacrylate), a catalyst which is sodium methoxide dissolved in methanol and benzene is fed through line 2 into reactor 4 which is operated under refluxing conditions. Overhead from reactor 4 there is withdrawn via line 8 a constant boiling mixture of benzene and methanol containing a small amount of methyl methacrylate which is introduced into condenser 10. Condensate from condenser 10 consisting of the constant boiling mixture, previously described, is introduced into a molecular sieve bed 16 via lines 12 and 14. The molecular sieve bed may contain either a type 3A or a type 4A molecular sieve. From molecular sieve bed 16 a methanol-free effluent is passed by means of line 18 and pump 20 from line 22 to line 38 by which the recycle benzene thus-obtained is returned to the feed stream entering the reactor through line 2.

Reactor 4 is equipped with a heating means 6 which can be, for example, a steam coil. A product stream consisting of the product dimethylaminoethyl methacrylate, unreacted methyl methacrylate, unreacted dimethylaminoethanol, catalyst, inhibitor, and benzene is withdrawn from reactor 4 and sent via line 24 to distillation column 26. Overhead from distillation column 26 benzene is withdrawn via line 28 and passed to condenser 30 where it is condensed. The benzene condensate from condenser 30 is passed by means of line 32 and pump 36 to recycle benzene line 38. Distillation column 26 is equipped with a suitable reboiler system 44 which can be, for example, heated with steam. A bottoms stream containing the product dimethylaminoethyl methacrylate, unreacted methyl methacrylate, unreacted dimethylaminoethanol, catalyst and inhibitor is removed from distillation column 26 and sent to distillation zone 46 via line 42. Distillation zone 46 can comprise, for example, a series of fractionating towers suitable for separating the feed stream entering the distillation zone through line 42 into its separate components. The product dimethylaminoethyl methacrylate is passed from distillation zone 46 via line 52 and sent to an appropriate storage area, unreacted methyl methacrylate is recycled via line 48, pump 49 and line 49a to the feed stream entering reactor 4 through line 2 and unreacted dimethylethanolamine recovered in the fractionation zone 46 is returned via line 50 to pump 51 and then via line 51a to the feed stream entering reactor 4 through line 2. Optionally, the methyl methacrylate and dimethylethanolamine can be recovered and recycled together. The inhibitor, catalyst and a small amount of polymer leaving fractionation zone 46 by line 54 are sent to an appropriate disposal system.

In actual practice of this invention a pair of molecular sieve beds, i.e., 16 and 56, are used for each molecular sieve bed 16 represented in the accompanying drawing. While one of the beds is used in the line, the other molecular sieve bed is being regenerated. Prior to the regeneration step, preferably, the sieve bed is purged by passing nitrogen through it at a temperature of about 30°–80° C. to remove occluded benzene and methyl methacrylate which can be recovered in a suitable recovery system, not shown, and then recycled to the reaction zone. For regeneration purposes, an inert gas is used to desorb the molecular sieve beds. Suitably, this gas is nitrogen heated to a temperature of about 350° C. which is passed through the molecular sieve bed via lines 53 and 55 into bed 16 or via line 53 into bed 56, depending upon the particular bed being regenerated. Nitrogen gas leaving the molecular sieve bed 16 during the regeneration cycle is sent via line 58 to condenser 62 where the methanol contained therein is condensed and the condensate then passed to a storage area via line 66, while the non-condensable gases are vented from condenser 62 through line 64. Likewise, during the regeneration of sieve bed 56 the heated nitrogen gas together with methanol from the sieve is passed via lines 60 and 58 to condenser 62. To conclude the regeneration treatment air at a temperature of about 400° C. is passed through the sieve bed in order to oxidize any traces of organic matter remaining in the sieve.

Examples I–IV

In a series of examples the effect of the catalyst type on the production of dimethylaminoethyl methacrylate (referred to as DMAEMA) by the process of this invention was demonstrated.

The basic reaction system utilized in these examples was a 3-neck, round-bottom flask equipped with a heating mantle, a means of introducing a gas blanket, a sampling port, a thermometer, and a Vigreaux distillation column, together with condenser and a modified Dean-Stark trap or Soxhlet extractor containing molecular sieve through which the condensed distillate was passed prior to being returned to the reaction flask. Transesterification, in this series of tests was carried out as a batch reaction by adding the catalyst in increments to the other ingredients during the early part of the reaction. The volatile ingredients including the methanol, the solvent and some methyl methacrylate were distilled off as an azeotropic mixture during the reaction which was conducted under refluxing condition. In these examples molecular sieve percolation was used and the methanol-free effluent from the molecular sieve bed was returned to the reaction flask. Pertinent details relating to these examples are shown in Table 1 which follows:

TABLE 1.—EFFECT OF NATURE OF CATALYST ON DMAEMA PRODUCTION

| Example | Catalyst | Catalyst concentration, parts sodium/part MM* | DMAEMA, yield, mole percent, basis DMEA** consumed |
|---|---|---|---|
| I | None | 0 | 0 |
| II | 25% sodium methoxide | 0.0107 | 79.6 |
| III | 12½% sodium methoxide | 0.0107 | 69.4 |
| IV | Sodium dimethylaminoethylate | 0.0107 | 60 |

*MM=methyl methacrylate.
**DMEA=dimethylaminoethanol.

NOTE.—Other conditions:
Sodium methoxide was dissolved in methanol. Inhibitor: Examples I and II, p-phenylenediamine, Examples III and IV, p-methoxyphenol. Reaction temperature: 82–92° C. Reaction time: Examples I and III, 2 hours; Examples II and IV, 3 hours. Weight ratio, MM/DMEA/inhibitor/benzene, 1/0.733/0.067/6.67 (in Example I, 1/0.88/0.08/6.5). Methanol removed from distillate by 4A molecular sieve.

These data indicate the superiority of sodium methoxide over sodium dimethylaminoethylate as a catalyst in this transesterification process.

What is claimed is:

1. A process for preparing a dialkylaminoethyl methacrylate which comprises:
   (a) reacting methyl methacrylate under refluxing conditions in a reaction zone with an alcohol of the formula:

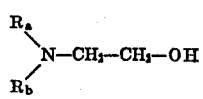

wherein $R_a$ and $R_b$ are independently selected alkyl groups of from 1 to 5 carbon atoms, in the presence of a transesterification catalyst and an entrainer,
   (b) withdrawing overhead from the reaction zone a constant boiling mixture of methanol and the entrainer,
   (c) condensing the said constant boiling mixture and afterwards passing it through a molecular sieve bed whereby the methanol is removed,
   (d) recycling the methanol-free benzene effluent withdrawn from the molecular sieve bed to the reaction zone,
   (e) withdrawing from the reaction zone a reaction mixture stream containing the dialkylaminoethyl methacrylate, and
   (f) recovering the said dialkylaminoethyl methacrylate from the said reaction mixture stream.

2. The process of claim 1 wherein the said catalyst is selected from the group consisting of alkali metal alkoxides, alkali metal amino alkoxides and alkali metal hydroxides.

3. The process of claim 1 wherein the said entrainer is selected from the group consisting of benzene, toluene, cyclohexane and isohexane.

4. The process of claim 1 wherein the said catalyst is sodium methoxide.

5. The process of claim 1 wherein the said entrainer is benzene.

6. The process of claim 1 wherein the said alcohol is dimethylaminoethanol.

7. The process of claim 1 wherein the said molecular sieve is type 4A.

8. The process of claim 1 wherein the said methyl methacrylate charged to the reaction zone contains from about 1 to about 10 weight percent of an inhibitor.

9. The process of claim 1 wherein the mole ratio of the said methyl methacrylate to the said alcohol introduced into the reaction zone is from about 1.01:1 to about 7:1.

10. The process of claim 1 wherein the mole ratio of the said catalyst to the said alcohol introduced into the said reaction zone is from about 0.02:1 to about 0.1:1.

11. The process for preparing dimethylaminoethyl methacrylate which comprises:
   (a) reacting methyl methacrylate under refluxing conditions in a reaction zone with dimethylaminoethanol, in the presence of sodium methoxide and benzene,
   (b) withdrawing overhead from the reaction zone a constant boiling mixture of methanol and benzene,
   (c) condensing the said constant boiling mixture and afterwards passing it through a type 4A molecular sieve bed whereby the methanol is removed,
   (d) recycling the methanol-free benzene effluent from the molecular sieve bed to the reaction zone,
   (e) withdrawing from the reaction zone a reaction mixture stream containing dimethylaminoethyl methacrylate, and
   (f) recovering the said dimethylaminoethyl methacrylate from the said reaction mixture stream.

12. The process of claim 1 wherein the said molecular sieve bed is regenerated by (a) passing an inert gas heated to a temperature of about 250° to 550° C. through the said bed in order to remove occluded methanol therefrom and finally (b) passing air heated to an elevated temperature through the said bed in order to oxidize any remaining organic matter.

13. The process of claim 1 wherein the said inert gas is selected from the group consisting of nitrogen, flue gas and carbon dioxide.

14. The process of claim 1 wherein the said inert gas is nitrogen.

15. The process of claim 1 wherein the temperature of the said air is about 400° C.

16. The process of claim 1 wherein prior to step (a) the said sieve bed is purged by passing nitrogen at a temperature of about 30° to 80° C. therethrough to remove occluded benzene and methyl methacrylate.

17. The process of claim 11 wherein the said molecular sieve bed is regenerated by (a) passing nitrogen at a temperature of about 30° to 80° C. through the said bed to remove occluded benzene and methyl methacrylate, (b) desorbing the methanol by passing an inert gas at a temperature of about 250° to 550° C. through the said bed; and (c) passing air at an elevated temperature through the said sieve bed in order to oxidize any remaining organic matter.

References Cited

UNITED STATES PATENTS

| | | | |
|---|---|---|---|
| 3,122,486 | 2/1964 | Skarstrom | 203—41 |
| 3,132,079 | 5/1964 | Epperly et al. | 203—41 |
| 2,138,763 | 11/1938 | Graves | 260—488 R |

JAMES A. PATTEN, Primary Examiner

P. J. KILLOS, Assistant Examiner

U.S. Cl. X.R.

203—41, digest #6